W. HOTELING.
DRAIN PIPE INLET.
APPLICATION FILED OCT. 1, 1909.

972,860.

Patented Oct. 18, 1910.
2 SHEETS—SHEET 1.

Witnesses
J. C. Simpson
Henry T. Bright

Inventor
William Hoteling.
By Chandlee & Chandlee
Attorneys

W. HOTELING.
DRAIN PIPE INLET.
APPLICATION FILED OCT. 1, 1909.
972,860.
Patented Oct. 18, 1910.
2 SHEETS—SHEET 2.
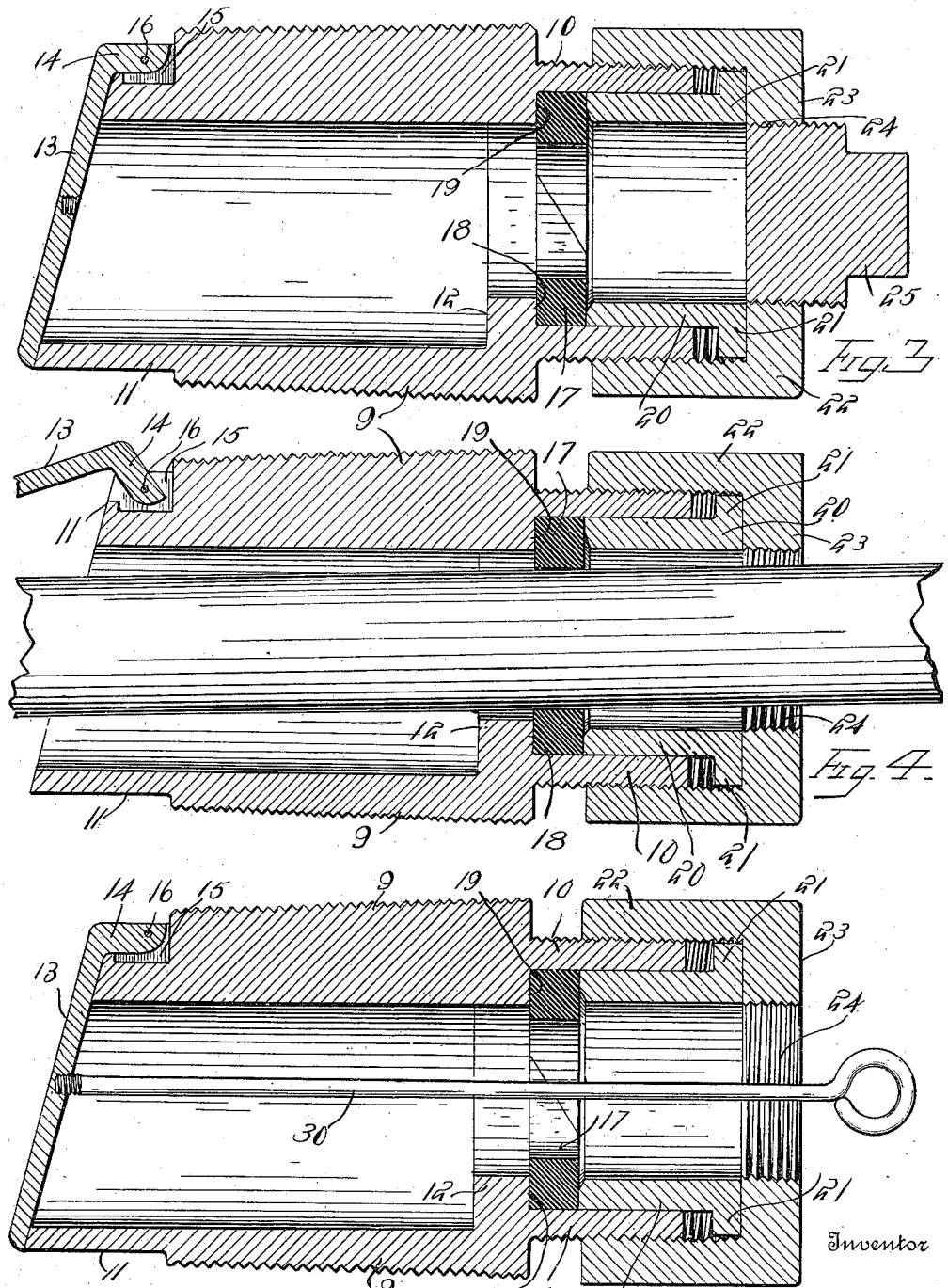

UNITED STATES PATENT OFFICE.

WILLIAM HOTELING, OF OBLONG, ILLINOIS.

DRAIN-PIPE INLET.

972,860. Specification of Letters Patent. Patented Oct. 18, 1910.

Application filed October 1, 1909. Serial No. 520,550.

*To all whom it may concern:*

Be it known that I, WILLIAM HOTELING, a citizen of the United States, residing at Oblong, in the county of Crawford, State of Illinois, have invented certain new and useful Improvements in Drain-Pipe Inlets; and I do hereby declare the following to be a full, clear, and exact description of the invention, such as will enable others skilled in the art to which it appertains to make and use the same.

This invention relates to drain pipe inlets and is particularly adapted for use in connection with oil tanks.

When oil is stored for any considerable period in tanks there is formed a brownish sediment commonly known as B. S. This sediment, if not removed will often extend above the inlet of the dispensing pipe line of the tank and will pass therethrough when said pipe line is open to the exclusion of marketable oil. Attempts have been made to remove this sediment by cutting a hole in the tank, inserting a pipe, and working the end of same around in the interior of the tank until the sediment is entirely drawn off by said pipe. This method, however, has proven inefficient and unsatisfactory inasmuch as there is always a leakage between the outside of the pipe and the wall of the opening through which it is inserted, and further after the sediment is removed so much time is required to take out the pipe and close the opening in the tank that a great waste of marketable oil results and a greater or less quantity of oil deposited directly upon the operator.

It is therefore the object of this invention to provide a drain pipe inlet mounted in the wall of the tank just above the bottom thereof, through which a drain pipe may be inserted at the will of the operator without the possibility of any leakage by way of the exterior of the pipe, and which when the pipe is withdrawn therefrom will automatically close and effectually provide against the undesirable waste of oil previously mentioned; the position of the automatic closing element of the inlet being such that same is operated prior to the complete withdrawal of the drain pipe from said inlet.

With these objects in view the invention consists in the details of construction and in the arrangement and combination of parts to be hereinafter more fully described and particularly pointed out in the claim.

Figure 1:
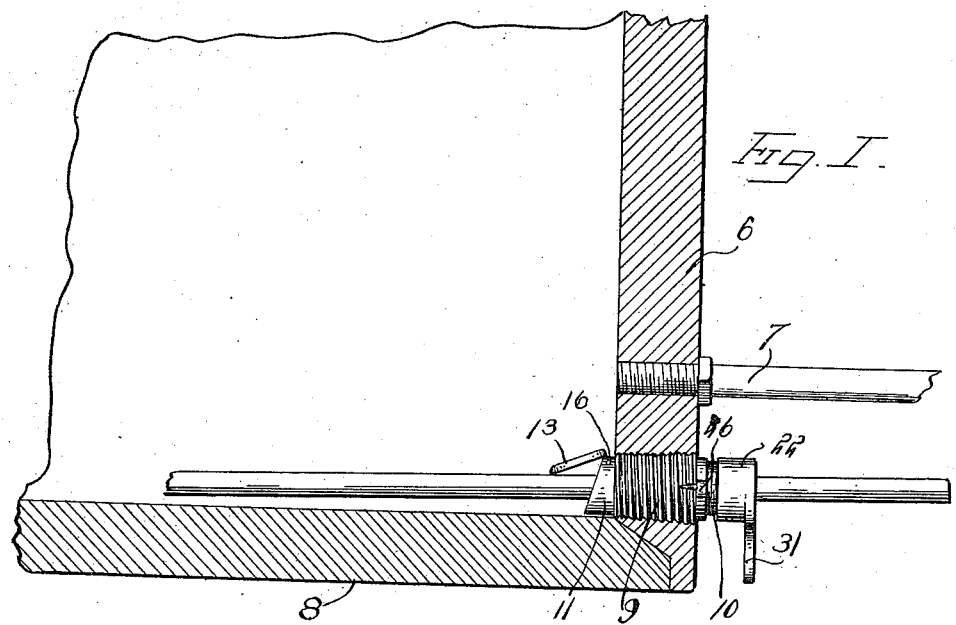
Figure 2:
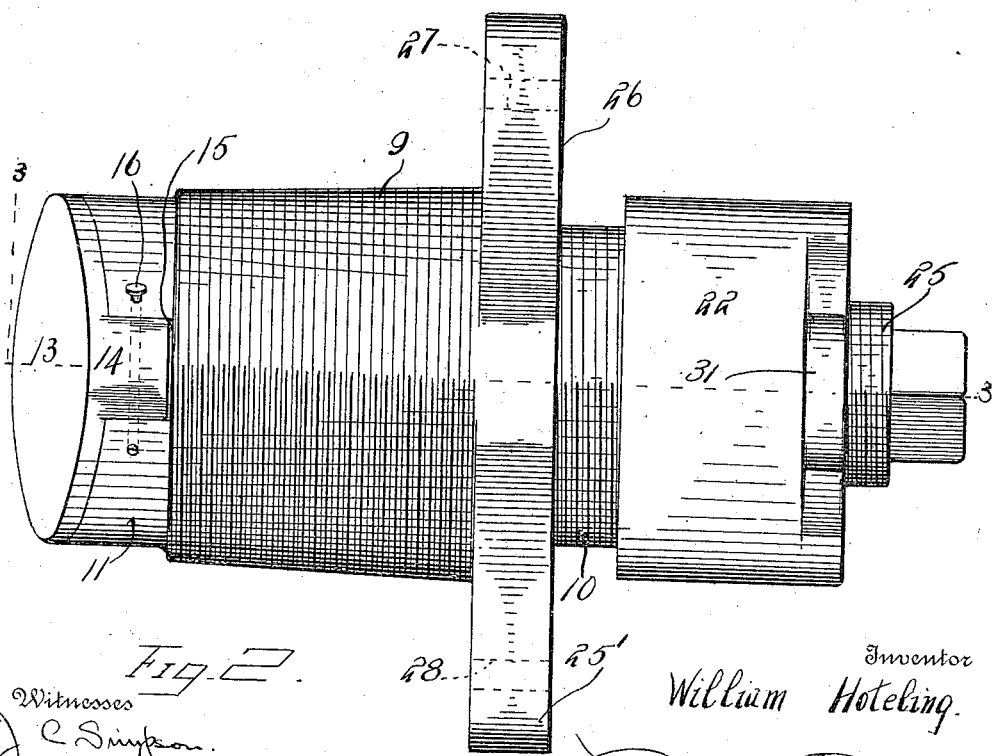

In describing the invention in detail reference will be had to the accompanying drawings wherein like characters of reference denote corresponding parts in the several views, and in which, Figure 1 is a fragmental section of an oil tank with the invention incorporated; Fig. 2, a top plan view of the invention in a closed state; Fig. 3, a section on the line 3—3 of Fig. 2; Fig. 4, a view similar to Fig. 3 with the closing cap removed and a drain pipe inserted through the inlet; and Fig. 5, a view similar to Fig. 3 showing a construction for holding the hinged valve of the inlet closed during the operation of screwing same into an oil tank to avoid possible injury to the valve.

Referring to the drawings 6 indicates an oil tank provided with a dispensing pipe line 7. The tank 6 is further provided with an opening, the lowermost portion of which is substantially in line with the upper face of the bottom 8 of said tank, and into this opening is adapted to be screwed the improved drain pipe inlet. Said inlet comprises a tubular body which is formed with a threaded central tapered portion 9, a diminished threaded forward portion 10 and a diminished rear portion 11, the threaded tapered central portion 9 being adapted for engagement with the wall of the oil tank to secure the inlet thereto. The bore of said inlet, through the portion 11 and portion 9 is out of alinement with the bore through the portion 10, whereby an annular flange 12 is produced in the interior thereof, the function of which will be presently described. The rear end of the inlet is inclined to the axis thereof. A flap valve 13 is provided with a lug 14 which is disposed in the recess 15 formed in the portion 11 of the body of the inlet and is pivotally connected to said body through the medium of the pivot pin 16; the manner of pivoting said valve being such that same constantly tends to seat itself under the influence of gravity upon the rear end of the inlet and close the bore therethrough. The forward end of the inlet constitutes, broadly speaking, a stuffing box for preventing any leakage around the outside of a pipe which is inserted therethrough. To this end a packing formed of a split rubber ring 17 is disposed against the shoulders 18 and 19 formed by the flange 12 and the disalined bores of the inlet. A follower 20 is mounted to telescope in the bore of the portion 10 and has its forward end provided with the annular flange 21 to limit the inward movement thereof by engagement of said flange with the front end of the portion 10 of the inlet. The rear end of the follower 20 is adapted to engage the rubber packing 17 and expand same transversely of the bore of the inlet when a pressure is applied to said follower. An interiorly threaded cap 22 is adapted to be screwed on the threaded surface of the portion 10 so as to effect an engagement between the outer end of the follower 20 with the top 23 of the cap 22 whereby said follower by continued movement of the cap on the portion 10 is forced inwardly to effect an expansion of the rubber packing 17 and thus diminish the diameter of the opening in said packing. The top 23 of the cap is provided centrally with a threaded opening 24 for the reception of a threaded plug 25 to positively close the inlet when not in use. Secured to the portion 9 are the laterally extending wings 25' and 26 which are provided with the apertures 27 and 28 respectively for the reception of screws or other similar securing elements which are in turn secured to the wall of the tank to prevent any turning of the inlet when mounted therein.

During the screwing of the inlet into the wall of the tank it is essential that the valve 13 be maintained seated to avoid any possible damage thereto. This result is accomplished by providing the inner face of said valve with a threaded recess 29 in which is secured the threaded end of a rod 30 which extends entirely through the inlet and protrudes slightly forward of same. By this construction it will be obvious that the valve 13 can be maintained in its seated or closed position by exerting a slight pull on the rod 30 during the insertion of the inlet through the wall of the tank.

The operation of the device is as follows: Assuming the inlet to be applied to an oil tank in which there is an accumulated sediment to be removed, it is only necessary in order to insert a drain pipe through the inlet to first remove the plug 25 from engagement with the cap 22 and then pass the pipe through the portion 10 until the end thereof engages the packing 17. By the application of a slightly increased effort the pipe can be forced through the opening in said packing and the latter will expand against the outer surface of the pipe and produce a substantially liquid tight joint therebetween. Further movement of the pipe will cause the end thereof to engage the valve 13 and move same from its seat and the drain of the sediment through said pipe will then be instituted. Not only can the pipe when so inserted in the inlet be projected into the tank to any desired extent but same may be also manipulated to a limited degree in a horizontal and vertical direction by reason of the fact that the opening through the packing 17 is smaller in diameter than either the bore of the inlet through the portions 9 and 10 or the bore through the portion 11. After the sediment has been completely drained from the tank the pipe can be withdrawn, it being obvious that as soon as the end thereof has passed out of engagement with the valve 13 said valve will automatically seek its seat to close the inlet as a result of the influence of gravity. After a complete withdrawal of the pipe from the inlet the plug 25 is again inserted in the cap 22.

To facilitate the turning of the cap 22 upon the portion 10 to effect the actuation of the follower 20 a handle 31 is secured thereto.

As it is essential that the valve 13 shall be disposed with its free end at a greater distance inward of the tank than its pivoted end suitable designations may be put upon the outer face of the forward portion of the inlet to indicate the position in which the valve is disposed in the interior of the tank.

What is claimed is:

A device of the character described comprising a tubular member, a valve carried by said member and constantly tending to close the bore thereof at one end, the other end of said member being reduced exteriorly and internally and forming a shoulder within the bore of said tubular member, threads formed on the outer face of said reduced end, a compressible annular member within said reduced end disposed against said shoulder and having the opening therethrough of less diameter than the bore of the member, a follower slidingly mounted within said reduced end for movement toward and away from said compressible member and having a length in excess of the distance from the outer face of the compressible member to the outer end of the reduced end of the tubular member, a cap mounted for travel on the threaded outer face of the reduced end of the tubular member and adapted to engage the outer end of the follower to slide same against the compressible member, and a handle carried by said cap for manually rotating same.

In testimony whereof, I affix my signature, in presence of two witnesses.

WILLIAM HOTELING.

Witnesses:
A. H. HEY,
R. K. McCULLOUGH.